United States Patent [19]
Gurizzan et al.

[11] 3,827,449
[45] Aug. 6, 1974

[54] AUTOMATIC MECHANISM FOR THE DISCHARGE OF FLUID IN A PRESSURIZED SYSTEM

[76] Inventors: Luis Gurizzan; Alberto Gurizzan, both of 26 de Julio No. 122, Bernal, Buenos Aires; Modesto Albin Sayavedra, 25 de Mayo No. 170; Luis Alberto Otamendi, Ascasuhi No. 76, both of Quilmes, Buenos Aires; Pedro Antonio Mulas, Lamadrid No. 1570, Bernal, Buenos Aires, all of Argentina

[22] Filed: Dec. 29, 1972

[21] Appl. No.: 319,190

[30] Foreign Application Priority Data
Feb. 11, 1972 Argentina ............................ 240508

[52] U.S. Cl. ................. 137/68, 220/89 A, 222/397, 251/63
[51] Int. Cl. ........................ F16k 17/14, F16k 17/40
[58] Field of Search ............ 137/68, 73, 494; 222/5, 222/397; 251/63; 220/89 A, 27

[56] References Cited
UNITED STATES PATENTS
1,671,369  5/1928  Johann ................................. 137/68
2,505,456  4/1950  Beecher ............................... 137/68
3,269,598  8/1966  Butters et al. ........................... 222/5
3,288,922  11/1966  Matsudaira et al. .................. 137/68
3,399,802  9/1968  Wedner ............................... 137/68
3,590,839  7/1971  Moore .................................. 251/63
3,633,596  1/1972  Gerber ................................ 137/68

*Primary Examiner*—William R. Cline
*Assistant Examiner*—George L. Walton

[57] ABSTRACT

A mechanism for automatically releasing a pressurized fluid includes a slidable piston to puncture a seal normally closing the fluit outlet, the piston being controlled by the pressure differential between fluids on opposite dies of a cylinder and normally equalized by communication with the pressurized fluid: actuation of the piston results from exposure of one side of the cylinder to atmospheric pressure.

3 Claims, 5 Drawing Figures

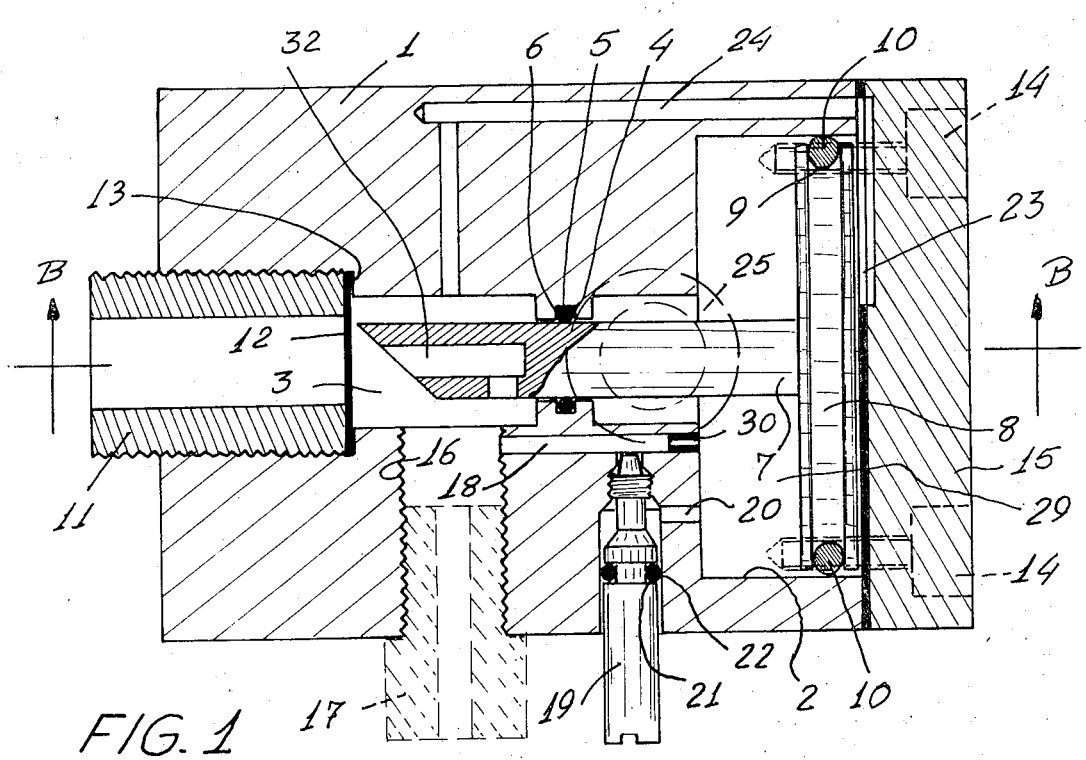
FIG. 1
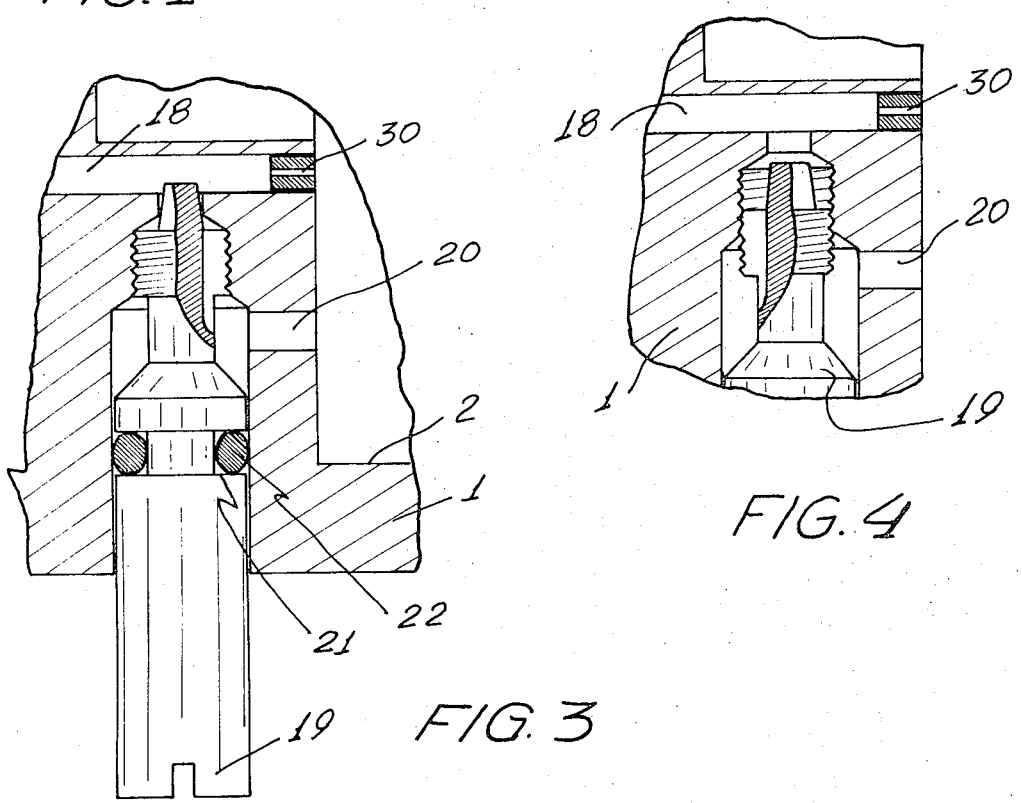
FIG. 3
FIG. 4

AUTOMATIC MECHANISM FOR THE DISCHARGE OF FLUID IN A PRESSURIZED SYSTEM

The present invention refers to an automatic device capable of initiating the discharge of a liquid or a gas, contained in its pressurized system, when a variable being controlled by means of sensors joined to the device reaches a determined value.

Said device consists basically in a piston which, acting upon difference in pressures between the opposing faces thereof, perforates the membrane which is located in front of the percussion rod of the piston and which seals the outlet from the liquid or gas pressurized system. The percussion piston separates two chambers, the first of which is joined directly to the pressurized system by means of a conduit, while the second chamber, after being brought to the system pressure in order that the device may become operative, is isolated from the said pressurized system by means of a needle valve.

The second chamber is separated from the atmosphere by a nylon membrane located at the end of a conduit. This membrane is acted upon by a resistance forming part of an electric circuit connected to the sensor device in charge of controlling the desired variable. In this manner, when the variable in question reaches a value at which it has been provided that the discharge take place from the pressurized system, the sensing device closes the electric resistance circuit which, in becoming incandescent, perforates the nylon membrane, thus connecting the second chamber directly with the atmosphere. Inasmuch as the other chamber continues in connection with the pressurized system, a difference in pressures occurs at the opposite faces of the percussion piston, said pressure difference causing the displacement of said piston and the consequent perforation of the membrane sealing the outlet of the pressurized system. In this manner the desired discharge is obtained.

It is to be noted that the variable to be controlled can be of any type, it being necessary in each case that the sensing system be adapted to the type of variable in question.

Furthermore, the system employed to perforate the nylon membrane can be of any type instead of the aforementioned electrical type.

In order that the invention may be clearly understood and readily put into practice, a preferred embodiment of same has been illustrated in the attached drawings.

In the drawings:

FIG. 1 is a lengthwise sectional view along line A—A of the device object of the present invention;

FIG. 3 shows a detail of the pressurization needle valve in observation position; and FIG. 4 shows a detail of the needle valve in open position;

Like numerals represent like or similar parts throughout the figures of the drawings.

Figure 2:
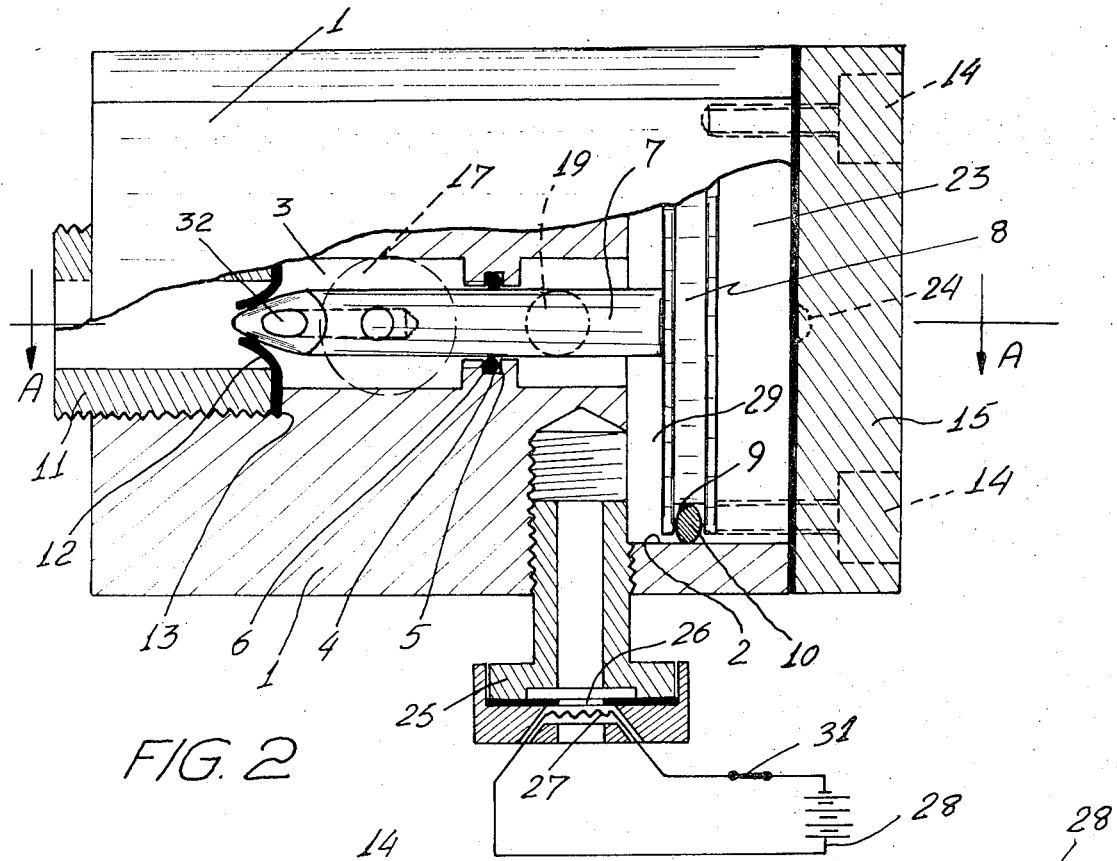
FIG. 2 is a part section along line B—B of the device object of the present invention.
Figure 5:
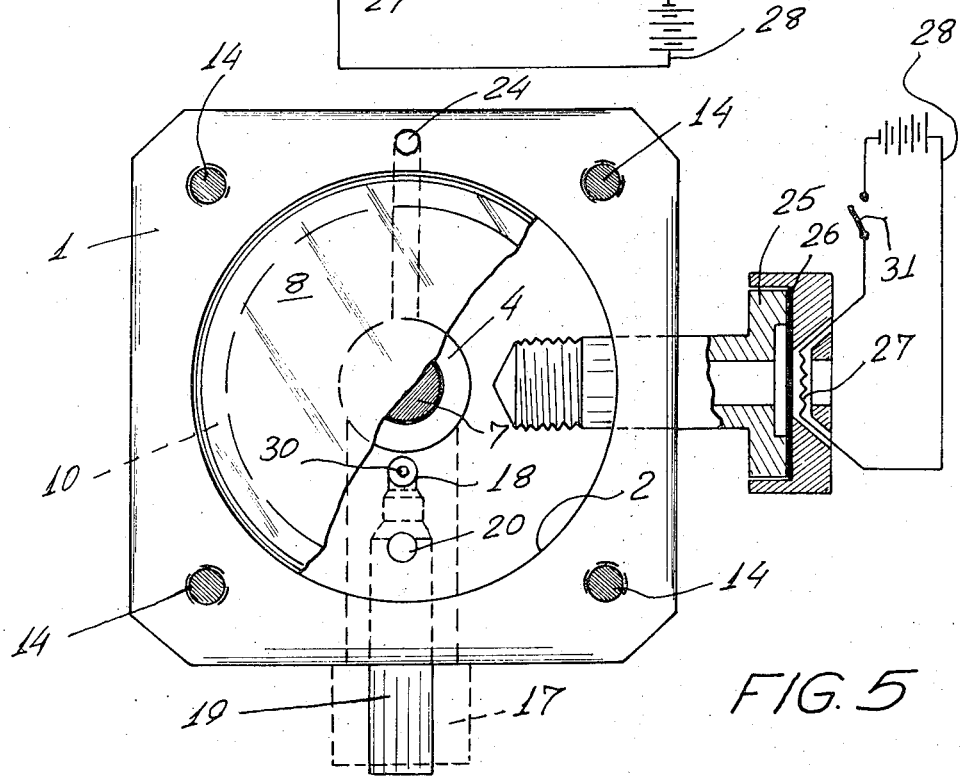
FIG. 5 illustrates a part section of the device object of the present invention, seen from the rear thereof.

Referring to the drawings, the invention comprises a prismatically shaped main body 1 the rear part of which contains a cylindrical cavity 2 extending into a lengthwise bore 3 having a diameter which passes entirely through the main body 1. Longitudinal bore 3 is provided with a circular shoulder 4 having a circumferential groove 5 serving as seat for a ring-type seal 6 within which the stem 7 of percussion piston 8 located within cylindrical cavity 2 is arranged to slide. Percussion piston 8 is also provided with a circumferential groove 9 receiving a ring-type piston seal 10 to provide sealing for aforesaid percussion piston 8.

An outlet coupling piece 11 is screwed into the front end of the longitudinal bore 3, said coupling piece 11 maintaining metal membrane 12, which seals the system outlet, tightly fitted against its circular seat 13.

A back cover 15 closes the cylindrical cavity 2 and is affixed to the main body 1 by means of screws located in boreholes 14.

A bore 16 is provided with its axis perpendicularly oriented regarding longitudinal bore 3, with which it is directly related. The inlet coupling piece 17, in turn connected to the pressurized system, is screwed into said bore 16.

The initial pressurization conduit 18, joining the pressurized liquid or gas system with the front chamber 29 through the initial pressurizing needle valve 19 and conduit 20, is normally situated with regard to aforesaid bore 16. Said needle valve 19 is provided with a circular groove 21 receiving a ring-type seal 22 for sealing purposes.

Conduit 24, connected to the pressurized liquid or gas system through back chamber 23, is communicated with inlet coupling piece 17 through bore 3.

A part 25, to one end of which is affixed nylon seal 26, and furthermore containing electrical resistance 27, connected to circuit 28 activated by sensing system 31, is threaded into the main body 1 and directly connected to the front portion 18 of the conduit.

In order that the device may be made operative, same must be connected to the pressurized system through a regulation valve intercalated between the outlet of the pressurized system and the inlet coupling piece 17 of the device. After this has been done, and needle valve 19 being totally open, said regulation valve is slowly opened, thus enabling the contents of the pressurized system to commence flowing within the device. In these conditions, front chamber 29 and rear chamber 23 will be communicated with the pressurized system, the former through conduits 18 and 20 and the latter through conduit 24. Pressure in the device will thus increase gradually and without pressure differences occurring between the opposite faces of aforesaid percussion piston 8.

When the pressure inside the device is equal to that of the pressurized system, the regulating valve of the latter is to be opened entirely, thereafter closing initial pressurization needle valve 19.

Once this has been done, the front chamber 29 will be isolated from the pressurized system and joined thereto only through the small compensating orifice 30 located at the end of the initial pressurization conduit 19, its mission being to transmit to the front chamber 29 small and very slow pressure variations occurring in the pressurized system.

In this manner the pressure at opposite sides of percussion piston 8 will at all times be the same.

Once the above steps have been taken it will be possible to activate sensing system 31. This system 31 is to actuate on the device to perforate the nylon membrane 26 when the variable reaches the level at which it is desired that the discharge take place. In this case, an electric circuit 28 is concerned, the resistor of which, together with membrane 26, is located within piece 25.

When the controlled variable reaches the desired value, the sensing device operates to close the electric circuit 28. Thus resistor 27 will become incandescent and will, due to combustion, perforate membrane 26. This will cause front chamber 29 suddenly to acquire atmospheric pressure inasmuch as, once membrane 26 has been pierced, said chamber is in direct contact with the outside. As a consequence, a difference in pressures will occur between the two opposing faces of percussion piston 8, causing the displacement thereof and causing stem 7 to perforate membrane 12, which seals the system outlet, resulting in the discharge of the pressurized system through conduit 32 located at the end of stem 7.

The invention as herein described and illustrated may be clearly understood and no further explanations will be required by those versed in the art.

It is evident that sundry changes as to construction and detail may be made without departing from the scope of the present invention, as clearly determined in the following claims.

We claim:

1. An automatic device capable of initiating the discharge of a liquid or gas, contained in a pressurized system, in function of activation produced by a sensor controlling a variable, characterized by the fact of comprising a rigid body in which are formed a closed cylindrical chamber, a coaxial bore parting from the bottom of said chamber and debouching at the outside of said body, a first communication conduit communicating the bottom of said chamber with the outside, a second communication conduit communicating a region adjacent to the chamber cover with a second bore the axis of which is directed transversally with regard to the chamber axis, said second bore communicating the pressurized system with the coaxial bore and communicating with the chamber bottom through a restricted diameter connection and a regulatable valve, said chamber housing a slidable piston having a stem which projects into the coaxial bore and terminates in a membrane puncturing means facing a membrane closing the outside bore outlet, a seal element being provided between the stem and the wall of the coaxial bore, situated between the entry of the second bore to the coaxial bore and the bottom of the chamber, said first conduit communicating the chamber with the outside being provided with a closure means facing a perforating device connected to the control sensor.

2. A device in accordance with foregoing claim 1, characterized by the fact that the pointed end of the stem is provided with a coaxial bore debouching laterally in the proximities of said end.

3. A device in accordance with foregoing claim 1, characterized by the fact that the closure means and the perforating device facing same consist respectively of a membrane of combustible material and a resistor connected to a current source through an intercalated switch which is responsive to the control sensor.

* * * * *